UNITED STATES PATENT OFFICE.

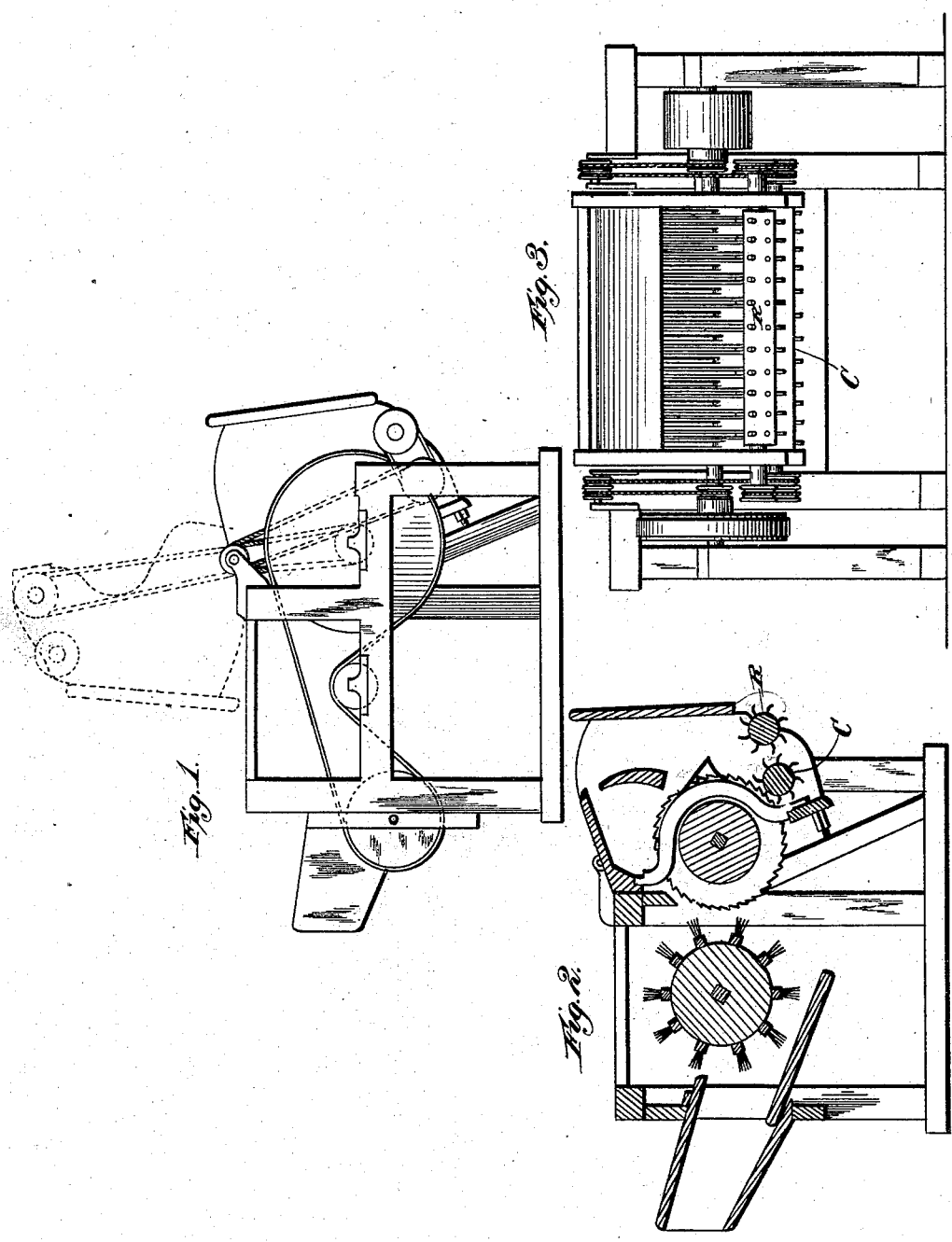

JOHN D. MILBURN AND RICHARD R. GWATHNEY, OF MEMPHIS, TENN.

COTTON-GIN.

SPECIFICATION forming part of Letters Patent No. 240,748, dated April 26, 1881.

Application filed April 4, 1881. (No model.)

*To all whom it may concern:*

Be it known that we, JOHN D. MILBURN and RICHARD R. GWATHNEY, both citizens of the United States, residing at Memphis, in the county of Shelby and State of Tennessee, have invented new and useful Improvements in Cotton-Gins, of which the following is a specification.

This invention relates to an improvement on the cotton-gin shown and described in the patent granted to Wilson and Payne, April 27, 1858, No. 20,120, and known in the market as the "Eclipse Gin."

The object of the present improvement is to more quickly and thoroughly effect a separation of the dust, trash, and bolls from the seed-cotton in the feed-box than is done in the old machine, to quickly discharge the hulls and trash after separation, and prevent them from becoming formed, with the seed-cotton, into a roll, thereby enabling the feed-roller to present seed-cotton promptly and regularly to the gin-saws, thus giving the machine a hulling capacity equal to its ginning capacity, and enabling the gin to yield about the same quantity of ginned cotton from hully cotton as from cotton without hulls.

It has the further object to deliver the hulls from the machine a sufficient distance to keep them, or a major portion of them, away from the seed as they fall from the saws, thus facilitating the separation of the hulls from the seed, enabling the ginner, while the machine is in operation, to save the seed comparatively clean from hulls and trash.

The Eclipse gin is provided with a single feed-roller, in front of which is a grating, in the bottom of the outer breast of the feed-box, for supporting the cotton and facilitating the discharge of the hulls, trash, &c.

In the accomplishment of the objects above set forth we have dispensed with the grating and arranged in its place an additional roller, which may be either plain-surfaced or corrugated, or provided with teeth similar to those of the feed-roller. This additional roller is arranged a little above and in advance of the feed-roller, and its shaft, projecting on the outside of the breast-head, is provided with a pulley connected with a similar pulley on the feed-roller shaft, or otherwise, as we may select, by a belt, so that the two rollers revolve in the same direction. The additional roller referred to, while in revolution, bearing on the upper surfaces of the stalks and trash, materially assists in the operation of throwing the said stalks and trash out of the hopper. This additional roller also acts as an agitator in the feed-box, and effectually prevents the formation of the cotton, whether clean, hully, or trashy, from forming into a roll. A small portion of the hulls will drop between the two rollers, but generally on the outside of the agitator-roller.

In the accompanying drawings, Figure 1 is a side elevation of the Eclipse gin provided with our improvement. Fig. 2 is a vertical longitudinal section, and Fig. 3 is a front elevation.

The letter R designates the additional roller, which we have substituted in lieu of the grating in the old machine, the other parts being practically the same as in said old gin, and therefore requiring no particular description here. This additional roller is driven from a pulley on the projecting end of its shaft, either from feed-roller or cylinder-shaft. With the exception of this roller, the gin is operated as it was previous to our improvement.

Having thus described our improvement, what we claim in this application as new in cotton-gins, and desire to secure by Letters Patent, is—

The cylinder R, in combination with the feed-roller C, as and for the purposes as hereinbefore described and set forth.

In testimony whereof we have hereunto set our hands in the presence of two subscribing witnesses.

JOHN D. MILBURN.
RICHARD R. GWATHNEY.

Witnesses:
F. W. ROYSLER,
W. M. TAYLOR.